(12) United States Patent
Fujiki

(10) Patent No.: US 6,542,254 B1
(45) Date of Patent: Apr. 1, 2003

(54) FACSIMILE DEVICE, FACSIMILE TRANSMISSION METHOD AND PROGRAM RECORDING MEDIUM

(75) Inventor: Shinobu Fujiki, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/135,240

(22) Filed: Aug. 17, 1998

(30) Foreign Application Priority Data

Aug. 18, 1997 (JP) .............................. 9-221732

(51) Int. Cl.⁷ ............................................ H04M 11/00
(52) U.S. Cl. ...................................... 358/1.15; 358/437
(58) Field of Search ................................ 358/1.15, 1.1, 358/1.14, 437, 442, 402, 468; 709/239, 240; 379/93.01, 100.12

(56) References Cited

U.S. PATENT DOCUMENTS

| 4,771,313 | A | * | 9/1988 | Kuroda et al. | ............... 355/3 R |
| 5,461,488 | A | * | 10/1995 | Witek | .......................... 358/402 |
| 5,500,890 | A | * | 3/1996 | Rogge et al. | .................. 379/91 |
| 5,608,786 | A | * | 3/1997 | Gordon | ....................... 379/100 |
| H1677 | H | * | 9/1997 | Hu et al. | ..................... 358/468 |
| 5,798,848 | A | * | 8/1998 | Ouchi | ......................... 358/468 |
| 5,805,587 | A | * | 9/1998 | Norris et al. | ................. 379/215 |
| 5,812,278 | A | * | 9/1998 | Toyoda et al. | ............... 358/402 |
| 5,854,694 | A | * | 12/1998 | Payne et al. | ................. 358/473 |
| 5,982,860 | A | * | 11/1999 | Kim | ....................... 379/100.15 |
| 6,018,572 | A | * | 1/2000 | Foladare et al. | ............. 379/211 |
| 6,058,169 | A | * | 5/2000 | Bramnick et al. | ...... 379/100.01 |
| 6,069,882 | A | * | 5/2000 | Zellner et al. | ............... 370/329 |
| 6,072,599 | A | * | 6/2000 | Oba et al. | .................... 358/444 |
| 6,147,774 | A | * | 11/2000 | Hamadani et al. | ........ 74/473.12 |
| 6,323,962 | B1 | * | 11/2001 | Itoh et al. | .................... 358/468 |

FOREIGN PATENT DOCUMENTS

JP 08084214 A * 3/1996 ............ H04N/1/00

* cited by examiner

Primary Examiner—Thomas D. Lee
Assistant Examiner—Stephen Brinich
(74) Attorney, Agent, or Firm—Hogan & Hartson, LLP

(57) ABSTRACT

When a time scheduled for connection to the Internet service provider and a time for facsimile communication overlap, electronic mail functions are delayed and facsimile communication is given priority. If a facsimile communication request is made while a line connection to the Internet service provider is already established, electronic mail reception is halted, and facsimile communication takes place. A facsimile device provided with facsimile communication capability and the ability to send and receive image data in the form of electronic mail via an Internet service provider.

15 Claims, 3 Drawing Sheets

FACSIMILE DEVICE, FACSIMILE TRANSMISSION METHOD AND PROGRAM RECORDING MEDIUM

BACKGROUND OF THE INVENTION

1. Field of the Invention

The present invention relates to a facsimile device provided with regular G3 or G4 facsimile transmission capability, and a function for connecting to a computer network like the internet to send and receive image data in the form of electronic mail (email).

2. Description of the Related Art

Recently, computer communication networks like the internet have been growing increasingly popular. Some reasons for this growth are that computer communication networks allow communication errors to be easily corrected, and that the user can communicate not just domestically but all over the world only on just the cost of communication (telephone line charges and the provider fee) with a local service provider (a business between a user and the computer communication network).

Since conventional facsimile communication protocol differs from computer communication network protocol, direct communication between a facsimile device and a computer communication network is generally impossible. However, if the format of facsimile image data is converted to the format of the electronic mail message, e.g., TIFF format (Tagged Image File Format), two facsimile machines can send and receive data between each other by way of a computer communication network.

Based on the above described fact that facsimile devices can send and receive image data over the computer communication network in the form of electronic mail, facsimile devices equipped with an electronic mail function are developed.

In general, the conventional facsimile devices equipped with the electronic mail capability contact an ISP (Internet Service Provider) regularly at predetermined times to receive electronic mail. On the other hand, these electronic mail-capable facsimile devices are provided with regular facsimile functions using telephone lines, and can be programmed to transmit facsimile data at a preset time as well. This leaves open the possibility that a problem could a rise from confusion between facsimile transmission and ISP connection when facsimile operation and internet connection overlap.

SUMMARY OF THE INVENTION

It is an object of the present invention to propose a more user-friendly facsimile device by eliminating the confusion created when facsimile communication and ISP connection overlap.

It is another object of the present invention to propose a facsimile device which can inform a user of a fact that a preset facsimile communication time overlaps a preset ISP connection time if it is the case.

A facsimile device according to one aspect of the present invention is provided with facsimile communication functionality, and the capability to send and receive image data in the form of electronic mail via an ISP, and comprises a means for determining if the programed facsimile communication time and the programmed ISP connect time overlap, and a means for giving priority to facsimile communication in the case where they do overlap. When ISP connection and facsimile communication overlap, the electronic mail communication, with momentarily lower priority, is delayed while facsimile communication is given precedence. Thus, even when ISP connection and facsimile communication overlap, confusion does not arise. Priority is given to the facsimile communication since the facsimile communication is a faster way of communication than the electronic mail communication in a sense. This is because the electronic mail transmission requires sending of an electronic mail to a provider (server) of recipient, and downloading of the electronic mail by a recipient. On the other hand, the facsimile transmission can directly send facsimile data to a recipient's machine.

The facsimile device may further include a means to determine whether a request for facsimile communication occurs during reception of electronic mail (or while the facsimile device is being connected to the ISP), and a means to stop electronic mail reception when it does receive such a request. Thus, if a user of the facsimile device wants to send facsimile data to a remote device and operates a control panel of the facsimile device for facsimile communication while the facsimile machine is already connected with an ISP by automatic ISP connection, the facsimile device will terminate the connection with the ISP and halt electronic mail reception, giving priority to the facsimile communication. Likewise, if a preset facsimile transmission time comes while the facsimile machine is connected to ISP, the connection to ISP is cut and the automatic facsimile transmission is initiated. Hence, facsimile communication, with momentarily higher priority, is processed immediately without delay, making operation more user-friendly.

A facsimile device according to another aspect of the present invention comprises a means to determine if the programmed ISP connect time and the programmed facsimile communication time overlap, and a display means to indicate this fact to the user when the programmed times overlap. In this case, when the user sets the time at which facsimile communication is to take place and this time overlaps with the programmed ISP connect time, a message prompting the user of this fact is displayed. Thus, the user can either reenter the time programmed for facsimile communication such that it does not overlap with the programmed ISP connect time.

The display means may be replaced with or associated with another means for informing a user of a fact that a desired facsimile transmission time overlaps a preset ISP connection time. For instance, a sound generating means or lamp means may be provided instead of or in addition to the display means.

According to still another aspect of the present invention, there is provided a communication method suitable for a facsimile machine having a facsimile function and an electronic mail function, comprising the steps of determining whether or not it is currently a time specified for internet connection, determining whether or not facsimile communication is currently taking place if it is determined that it is currently the time specified for internet connection, connecting with the Internet service provider if it is determined that facsimile communication is not currently taking place, and downloading electronic mail from the Internet service provider. The communication method may further include the steps of determining if a request is generated for facsimile communication during reception of electronic mail, halting electronic mail reception and disconnecting a line to the Internet service provider if a request for facsimile communication is generated, and starting facsimile communication. The communication method may further include the step of reconnecting to the Internet service provider and restarting electronic mail reception upon completion of facsimile communication. The communication method may further include the step of informing a user of the facsimile device of a fact that the time for facsimile operation and the time for connection to the Internet service provider overlap.

According to yet another aspect of the present invention, there is provided a computer program recording medium or computer usable medium comprising a module for initiating connection with an Internet service provider, a module for initiating downloading of electronic mail from the Internet service provider, a module for determining if a request is generated for facsimile communication during reception of electronic mail, a module for halting electronic mail reception and disconnecting a line to the Internet service provider if a request for facsimile communication is generated, and a module for carrying out facsimile transmission. The term "computer usable medium" in this specification including the claims covers any physical object in which a program to be executed by CPU or the like is stored. For example, the "computer usable medium" may include a floppy disk, CD-ROM, hard disk drive, ROM, RAM, optical recording medium such as DVD, photomagnetic recording medium such as MO, magnetic recording medium such as magnetic tape, and semiconductor memory such as IC card and miniature card. The term "module" in this specification including the claims may be a hardware module consisting of single or multiple circuits, a software module to be executed by CPU, or a combination thereof. Some of the modules may be realized by one of software, hardware and a combination thereof, and other modules may be realized by any other means.

DETAILED DESCRIPTION OF THE INVENTION

Embodiments of the present invention will now be described in detail based on the accompanying drawings. The illustrated embodiments deal with a facsimile device employing the internet as a computer communication network.

Figure 1:
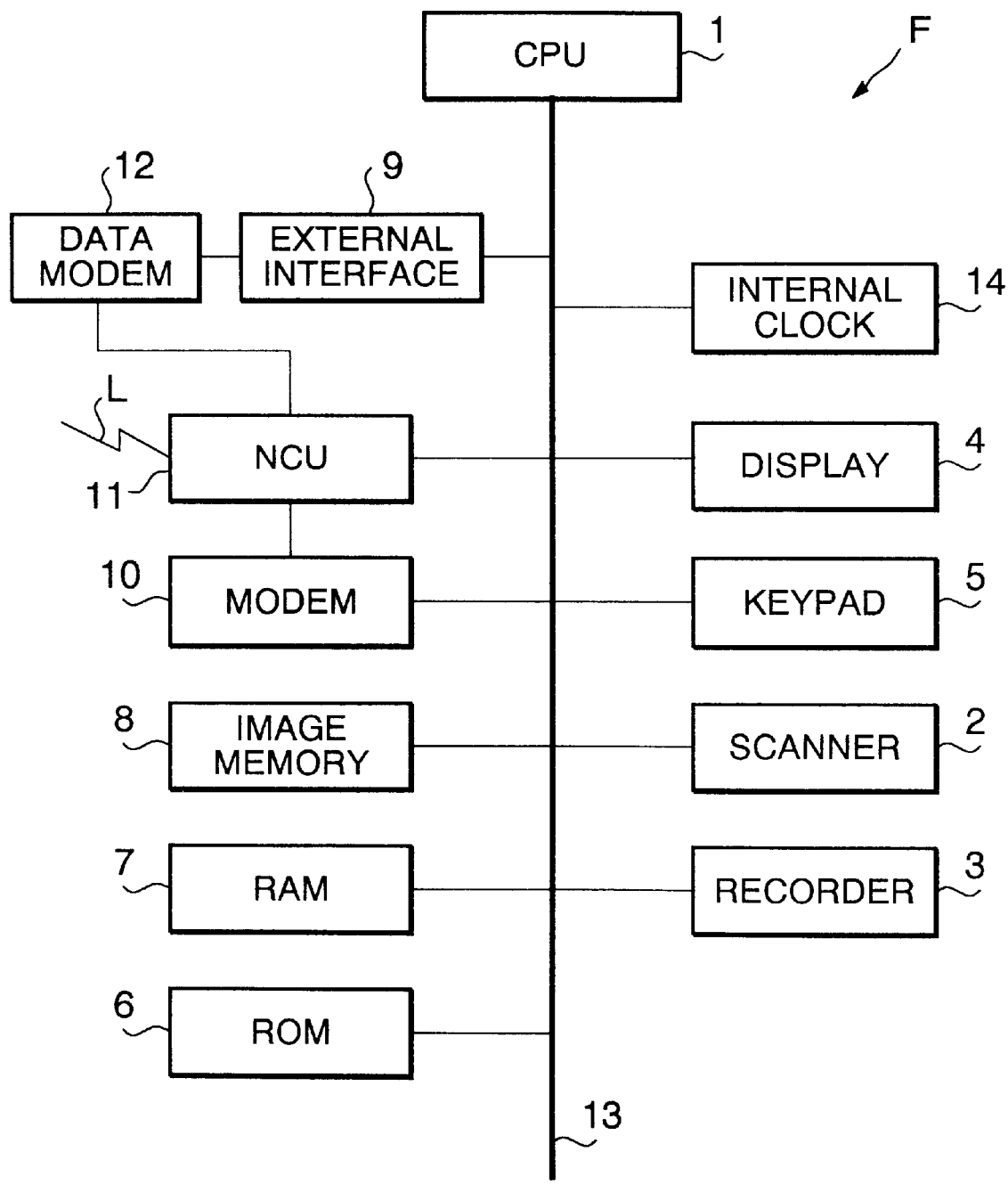
FIG. 1 is a block diagram showing the hardware organization of the facsimile device according to one embodiment of the present invention.

Referring to FIG. 1, the organization of the hardware of the facsimile device F according to a first embodiment will first be described. The facsimile device F is a conventional G3 or G4 type facsimile device to which internet communication capability has been further provided.

In FIG. 1, the facsimile device F includes CPU 1 as its main controller, and CPU 1 connects to each of hardware components (will be described below) of the facsimile device F via a bus 13. CPU 1 controls these hardware components and executes various programmed instructions according to a computer software. A scanner 2 scans the original document using a CCD, for example, and outputs the image as two-bit (binary) black and white image data. A recorder 3 is an electrophotographic printer or the like for printing out a hard copy of image data received from other facsimile devices as well as image data received via internet communication.

A display 4 is a liquid crystal display (LCD) or CRT display which indicates the operating condition of the facsimile device F, the image data of the document to be sent, or the received image data, and the like. It also displays a programmed ISP connect time entered by the user, a programed facsimile communication time entered by the user, and a message to the user in response to entry of the facsimile communication time.

A keypad 5 is a control panel provided with alphanumeric keys, a number pad, quick-dial keys, one-touch dial keys, function keys, and the like, necessary for operating the facsimile device F. The user presses one or more specified keys on the control panel 5 to set the time for facsimile communication. It is also possible to have some or all of the keys of the control panel 5 represented by touch-screen buttons on the display 4.

ROM 6 contains the various software programming required to operate the facsimile device F. RAM 7 is comprised of SRAM or flash memory, and temporarily stores data produced when the programs in the ROM 6 are executed. An image memory 8 is comprised of DRAM or the like, and stores the image data to be sent or the received image data.

A modem 10 is a common fax modem for facsimile communication. A data modem 12 is a data communication modem used for internet communication, and is connected to the bus 13 via an external interface 9. NCU (Network Control Unit) 11 is a hardware that controls connection to and disconnection from an analog line L. NCU 11 connects the modem 10 or data modem 12 to the analog line L as necessary. Reference numeral 14 designates a clock circuit that outputs the current time.

It should be noted that the facsimile device F may further be provided with DSU (Digital Service Unit), and connected to a digital line for baseband transmission.

The facsimile device F having the above-described hardware configuration possesses capability to communicate with other G3 or G4 facsimile devices, as well as capability to send and receive electronic mail of image data, mainly in TIFF format. In other words, the facsimile device F is able to convert the image data of the original document into TIFF format, and send and receive the image data as electronic mail via the internet. (Of course, the facsimile device F can send and receive ordinary facsimile image data.) The capability for this type of communication is contained in the facsimile software stored in ROM 6.

Next, operation of the facsimile device F will be described. As described above, the facsimile device F is capable of normal G3 facsimile communication over a telephone line as well as internet communication after the facsimile message has been converted into TIFF format or the like. Consequentially, ISP connection and facsimile communication may overlap. When this occurs in the facsimile device F, the facsimile communication is momentarily given priority, and electronic mail reception, with the lower priority, is delayed.

Figure 2:
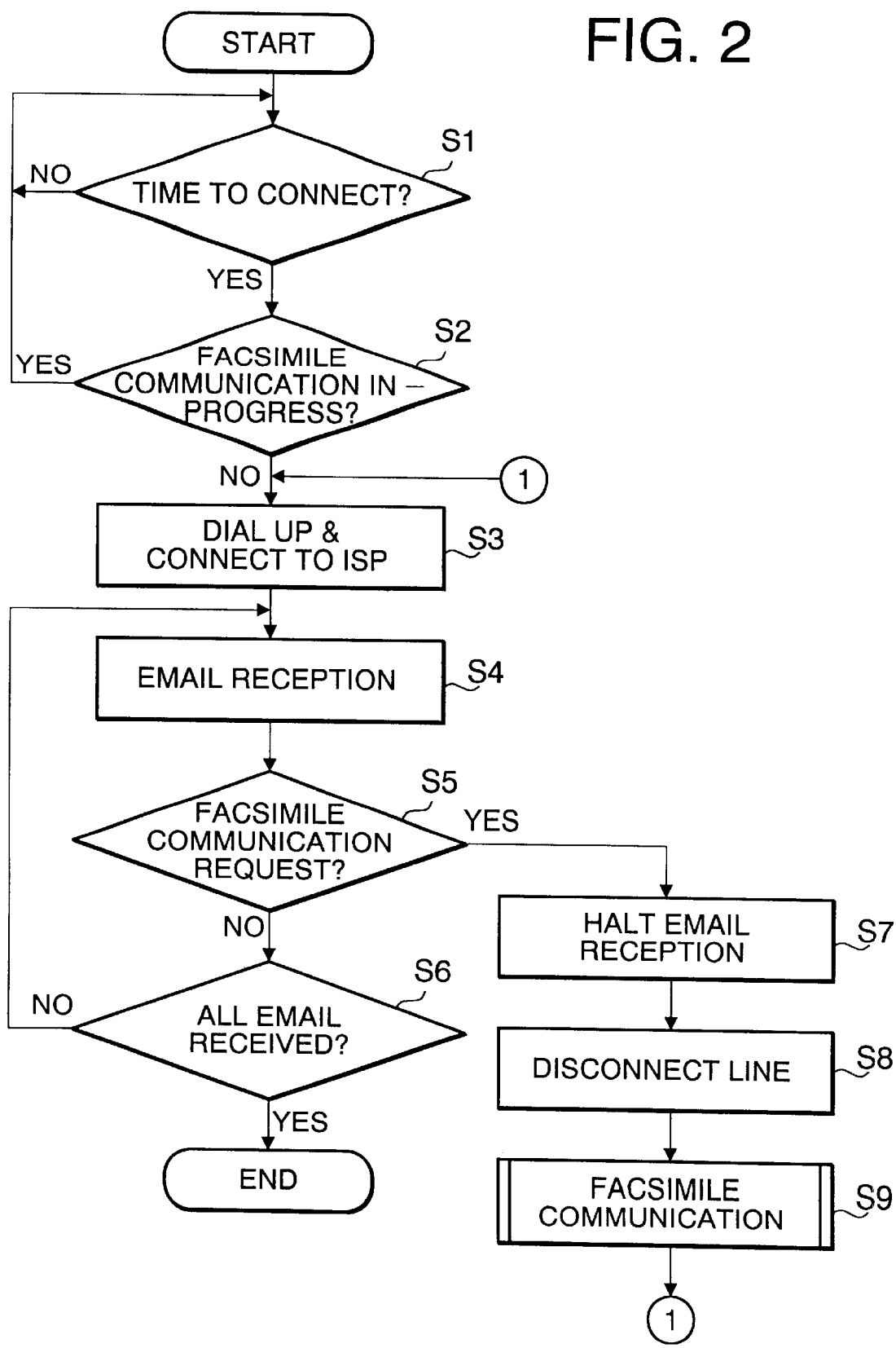
FIG. 2 is a flow chart showing an operating program of the facsimile device shown in FIG. 1.

The operation of the program execution of the facsimile device F of the present embodiment is now described in reference to the flow chart of FIG. 2.

First the CPU 1 reads the current time from the internal clock 14 and determines whether or not it is time to connect to the ISP (Step S1). If it is time to connect to the ISP (S1: YES), then it is determined whether or not facsimile communication is being carried out (Step S2). If a facsimile operation is being performed (S2: YES), then the program returns to Step S1. On the other hand if facsimile communication is not being carried out (S2: NO), then the facsimile device F dials up and connects with the ISP (Step S3). In other words, even when it is time to connect to the ISP, the facsimile device F will not connect to the ISP as long as facsimile communication is being carried out, but will connect to the ISP once the facsimile operation has ended.

After connecting with the ISP, electronic mail reception is initiated (Step S4). During electronic mail reception, however, it is determined whether or not a facsimile transmission request has been generated (Step S5). The facsimile transmission request may occur automatically at a preset time or manually by a user's operating the control panel 5. If there is no request for facsimile communication (S5: NO), CPU 1 determines whether or not all new electronic mail messages have been received (Step S6). If all email messages to be received have been downloaded (S6: YES), then electronic mail reception ends. If there are remaining electronic mail messages to be received (S6: NO), on the other hand, the program returns to Step S4 and continues the electronic mail receiving operation. Checking for a facsimile communication request occurs, for example, upon receiving of one page of image data-equivalent electronic mail message.

When a request for facsimile communication occurs during electronic mail reception, for example, when the user attempts to send facsimile data (S5: YES), electronic mail reception is terminated (Step S7), and the line connection between the facsimile device F and the ISP is disconnected (Step S8). The facsimile device F then performs the facsimile communication as requested (Step S9), and when the facsimile operation is completed, the program returns to Step S3 and dials into and reconnects to the ISP. In this way, even if the electronic mail communication has already started when facsimile transmission request is made, the electronic mail communication is stopped, the facsimile communication takes place, and once it is finished, the electronic mail reception starts again.

As understood from the above, when ISP connection and facsimile communication overlap, the facsimile communication, temporarily given precedence, occurs ahead of electronic mail reception, and the electronic mail reception is delayed until after the facsimile communication has finished.

Next, another embodiment of the present invention which can prevent the timing of ISP connection and facsimile communication from overlapping till be described.

Figure 3:
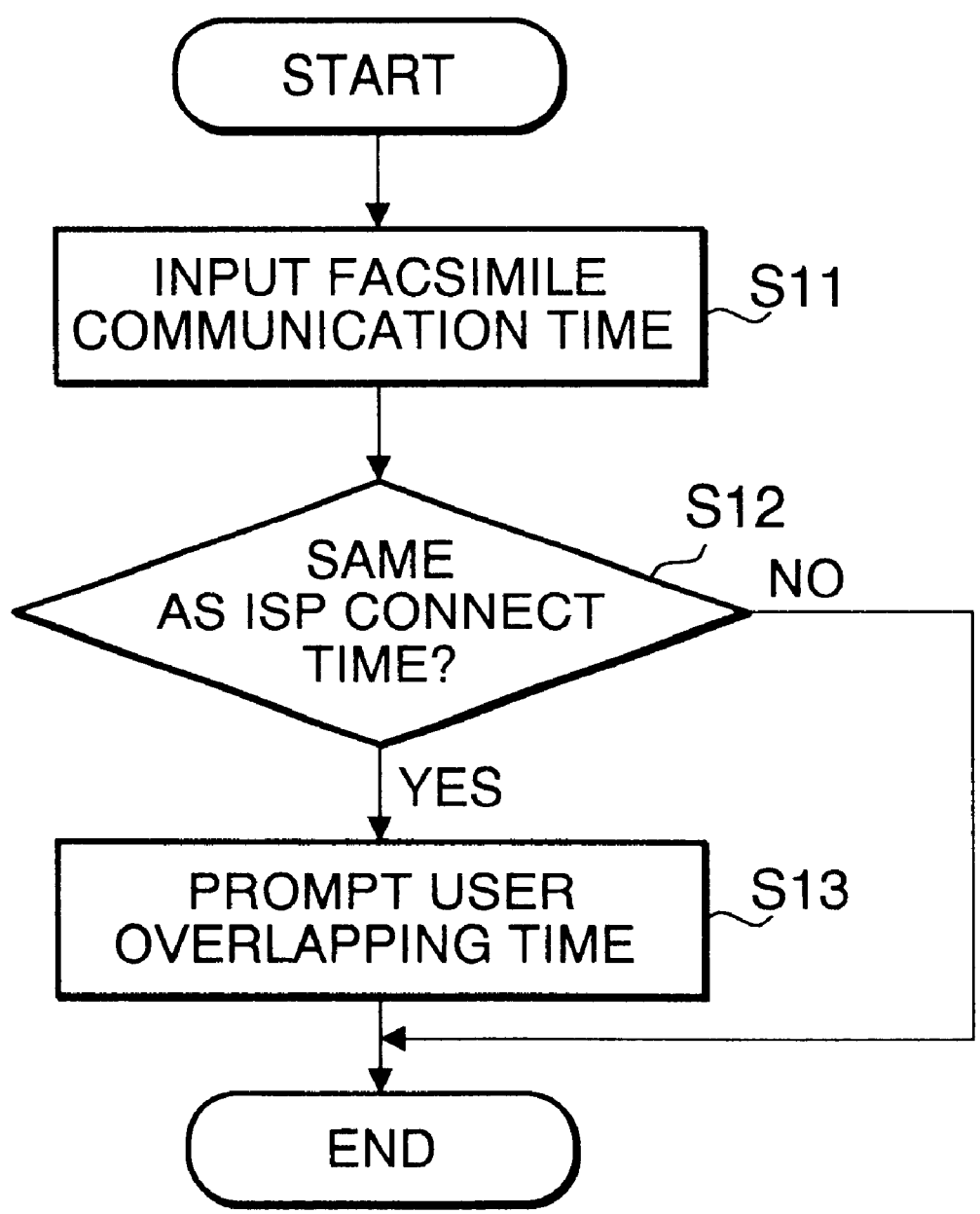
FIG. 3 is a flow chart showing an operating program of a facsimile device according to a second embodiment of the invention.

FIG. 3 is a flow chart showing the order of operations in the program according to this embodiment. A facsimile machine of this embodiment is the same as the first embodiment in configuration so that description of the hardware structure of the facsimile machine is omitted.

The user, using a specialized key on the keypad or control panel 5, inputs the time desired for facsimile transmission (Step S11). It should be noted that a time to connect to ISP is already installed to the facsimile machine.

It is then determined if the time input for facsimile transmission and the time input for ISP connection overlap (Step S12). If they do not overlap (S12: NO), the facsimile transmission time remains set as input by the user, and the program ends. However, if the times do overlap (S12: YES), a message prompting the user of this fact is shown on the display screen 4 (Step S13), and the user is advised to change the time of facsimile transmission. Thus, when the user inputs the desired time for facsimile transmission, overlap of facsimile transmission and ISP connection can be avoided. It should be noted that it is preferable for CPU to recognize that facsimile transmission and ISP connection programmed times can overlap even if they are not set at exactly the same time, and the facsimile device should thus warn the user when the programmed communication times are set close to each other. For instance, if the desired facsimile transmission time differs from the preset ISP connection time several minutes, the answer at Step S12 may become YES.

The present invention is not limited to the above described embodiments. For example, the facsimile device of the first and second embodiments can be modified as follows: the intervals at which the facsimile device connects with the ISP can vary according to the current time. Since facsimile communication is more frequently conducted during the daytime than at night, the CPU can be programed such that the predetermined intervals at which the facsimile machine accesses the ISP are lengthened during the daytime period and shortened at night. In this way, the overlap of facsimile communication and ISP connection can be further avoided.

Further, instead of or in addition to displaying a message on the display screen 4, a sound message may be generated or a particular lamp may be turned on in Step S13 to inform a user of a fact that a desired facsimile transmission time overlaps the preset ISP connection time.

What is claimed is:

1. A facsimile device provided with facsimile communication capability and ability to send and receive image data in the form of electronic mail via an Internet service provider, comprising:

first determination means for determining whether or not a programmed time for facsimile operations and a programmed time for connection to the Internet service provider overlap or are close before the programmed times; and means for giving priority to facsimile communication in the case where said facsimile operations and connection to the Internet service provider do overlap or are close.

2. The facsimile device of claim 1 further includes display means for indicating a fact that the programmed time for facsimile communication and the programmed time for connection to the Internet service provider overlap or are close.

3. The facsimile device of claim 1 further including:

second determination means for determining whether or not a facsimile communication request is generated while the facsimile device is connected with the Internet service provider for electronic mail reception; and means for halting electronic mail reception when such a request is generated.

4. The facsimile device of claim 3, wherein the facsimile communication request is a request made by a user manually at that time or made automatically according a previous setting.

5. The facsimile device of claim 3 further including means for reconnecting to the Internet service provider upon completion of facsimile communication.

6. A facsimile device provided with facsimile communication capability and ability to send and receive image data in the form of electronic mail via an Internet service provider, comprising:

first determination means for determining whether or not a programmed time for connecting to the Internet service provider and a programmed time for facsimile communication overlap or are close before the programmed times; and display means for indicating a fact that the programmed times for facsimile communication and connection to the Internet service provider overlap or are close.

7. A communication method for use in a facsimile device provided with facsimile communication capability and ability to send and receive image data in the form of electronic mail via an Internet service provider, comprising:

A) determining whether or not a programmed time for facsimile operation and a programmed time for connection to the Internet service provider overlap or are close before the programmed times; and B) giving priority to facsimile communication if the step A) determines that the programmed time for facsimile operation and the programmed time for connection to the Internet service provider overlap or are close.

8. The communication method of claim 7 further including the step of C) informing a user of the facsimile device of a fact that the programmed time for facsimile operation and the programmed time for connection to the Internet service provider overlap or are close.

9. The communication method of claim 7 further including the steps of:

D) determining whether or not there is a facsimile communication request while the facsimile device is connected with the Internet service provider; and F) halting electronic mail reception if there is such a request.

10. A method of operating a facsimile device adapted to operate via facsimile during a first programmed time period and adapted to operate over a computer network during a second programmed time period, comprising:

determining whether the first programmed time period and the second programmed time period overlap further comprises: determining whether the first programmed time period and the second programmed time period overlap, prior to the first programmed time period and the second programmed time period; and operating via facsimile before operating over a computer network, if the first programmed time period and the second programmed time period overlap.

11. A method of operating a facsimile device adapted to operate via facsimile during a first programmed time period and adapted to operate over a computer network during a second programmed time period, comprising:

determining whether the first programmed time period and the second programmed time period overlap, prior to the first programmed time period and the second programmed time period; and giving priority to operate via facsimile, if the first programmed time period and the second programmed time period overlap.

12. A method of operating a facsimile device adapted to operate via facsimile during a first programmed time period and adapted to operate over a computer network during a second programmed time period, comprising:

determining whether the first programmed time period and the second programmed time period overlap, prior to the first programmed time period and the second programmed time period; and delaying the second programmed time period to prevent the first programmed time period from overlapping with the second programmed time period.

13. A method of operating a facsimile device according to claim 12, further comprising:

operating via facsimile before operating over the computer network.

14. A method of operating a facsimile device adapted to send data via facsimile during a first programmed time period and adapted to send data over a computer network during a second programmed time period, comprising:

sending the data via facsimile before sending data over the computer network, if the first programmed time period and the second programmed time period overlap;

determining whether the first programmed time period and the second programed time period overlap, prior to the first programmed time period and the second programed time period; and delaying the second programmed time period to prevent the first programmed time period from overlapping with the second programmed time period.

15. A method of operating a facsimile device adapted to receive data via facsimile during a first programmed time period and adapted to receive data over a computer network during a second programmed time period, comprising:

receiving the data via facsimile before sending data over the computer network, if the first programmed time period and the second programmed time period overlap;

determining whether the first programmed time period and the second programmed time period overlap, prior to the first programmed time period and the second programmed time period; and delaying the second programmed time period to prevent the first programmed time period from overlapping with the second programmed time period.

* * * * *